US012401405B2

United States Patent
Tarver et al.

(10) Patent No.: US 12,401,405 B2
(45) Date of Patent: Aug. 26, 2025

(54) HIERARCHICAL BEAMFORMING AND RECIPROCITY CALIBRATION FOR HYBRID MIMO SYSTEMS

(71) Applicant: Samsung Electronics Co., Ltd., Suwon-si (KR)

(72) Inventors: Chance Anthony Tarver, Arlington, TX (US); Gang Xu, Allen, TX (US); Shadi Abu-Surra, Plano, TX (US); Won Suk Choi, McKinney, TX (US); Young Han Nam, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/419,358

(22) Filed: Jan. 22, 2024

(65) Prior Publication Data

US 2024/0333361 A1 Oct. 3, 2024

Related U.S. Application Data

(60) Provisional application No. 63/455,147, filed on Mar. 28, 2023.

(51) Int. Cl.
*H04B 7/06* (2006.01)
*H04B 7/0426* (2017.01)
(Continued)

(52) U.S. Cl.
CPC ........... *H04B 7/0686* (2013.01); *H04B 7/043* (2013.01); *H04B 17/12* (2015.01); *H04B 17/221* (2023.05)

(58) Field of Classification Search
CPC ...... H04B 7/0686; H04B 7/043; H04B 17/12; H04B 17/221; H04B 7/0617; H04B 17/21
See application file for complete search history.

(56) References Cited

U.S. PATENT DOCUMENTS 11,431,422 B2 8/2022 Hong
11,705,976 B2 7/2023 Vieira et al.
(Continued)

FOREIGN PATENT DOCUMENTS

CN 108712196 A 10/2018
EP 4012938 A1 * 6/2022 ............. H04B 17/12

OTHER PUBLICATIONS

International Search Report and Written Opinion issued Jul. 22, 2024 regarding International Application No. PCT/KR2024/003927, 7 pages.

*Primary Examiner* — Vineeta S Panwalkar

(57) ABSTRACT

A hybrid MIMO system comprises N digital transceiver chains and N analog beamformers, each coupled to one of the digital transceiver chains and comprising M analog transmitter (TX) chains and M analog receiver (RX) chains. One of the analog RX chains is an RX reference node and one of the analog TX chains is a TX reference node. A processor is coupled to a calibration transceiver, the transceiver chains, and the beamformers. For each beamformer the processor measures, using the corresponding transceiver chain and the calibration transceiver, TX and RX phase responses and TX and RX magnitude responses of the TX and RX reference nodes, respectively, determines a reciprocity calibration based on a phase difference between the TX and RX phase responses and a magnitude difference between the TX and RX magnitude responses, and applies the reciprocity calibration to stored beam definitions to correct for the phase and magnitude differences.

20 Claims, 15 Drawing Sheets

(51) Int. Cl.
*H04B 17/12* (2015.01)
*H04B 17/21* (2015.01)

(56) References Cited

U.S. PATENT DOCUMENTS

| | | |
|---|---|---|
| 2006/0133548 A1 | 6/2006 | Oh et al. |
| 2010/0309827 A1 | 12/2010 | Choi |
| 2016/0285534 A1 | 9/2016 | Li et al. |
| 2019/0123940 A1 | 4/2019 | Moorti et al. |
| 2022/0045728 A1* | 2/2022 | Ma ..................... H04B 7/0617 |
| 2022/0200678 A1 | 6/2022 | Ciochina et al. |
| 2022/0345335 A1 | 10/2022 | Chen et al. |

* cited by examiner

HIERARCHICAL BEAMFORMING AND RECIPROCITY CALIBRATION FOR HYBRID MIMO SYSTEMS

CROSS-REFERENCE TO RELATED APPLICATION AND CLAIM OF PRIORITY

This application claims priority under 35 U.S.C. § 119(e) to U.S. Provisional Patent Application No. 63/455,147 filed on Mar. 28, 2023, which is hereby incorporated by reference in its entirety.

TECHNICAL FIELD

This disclosure relates generally to beamforming antenna arrays in wireless communications systems. Embodiments of this disclosure relate to methods and apparatuses for hierarchical beamforming calibration and reciprocity calibration of hybrid multiple-input-multiple-output antenna array systems.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-point (CoMP), reception-end interference cancelation and the like.

Massive MIMO is a critical technology in 5G, where many antennas are used to serve multiple users simultaneously. In radio access technologies beyond 5G, the trend towards larger array sizes with more elements continues. However, to reduce the added complexity of more antennas, hybrid MIMO systems are being considered. In hybrid MIMO, digital beamforming is combined with analog beamforming to reduce the number of needed digital transceivers (TRX).

SUMMARY

Embodiments of the present disclosure provide methods and apparatuses that facilitate hierarchical beamforming calibration and reciprocity calibration of hybrid MIMO antenna array systems.

In one embodiment, a hybrid MIMO system is provided, comprising a first number (N) of digital transceiver chains, N analog beamformers, each operably coupled to a respective one of the digital transceiver chains, a calibration transceiver, and a processor operably coupled to the calibration transceiver, the digital transceiver chains, and the analog beamformers. Each analog beamformer comprises a second number (M) of analog transmitter (TX) chains and M analog receiver (RX) chains, wherein one of the analog RX chains is an RX reference node and one of the analog TX chains is a TX reference node, and a memory that is operably coupled to the analog TX chains and to the analog RX chains and is configured to store beam definitions. The calibration transceiver is operably coupled to the TX reference node and the RX reference node of each of the analog beamformers. The processor is configured to, for each analog beamformer: measure, using the corresponding digital transceiver chain and the calibration transceiver, a TX phase response and a TX magnitude response of the TX reference node and an RX phase response and an RX magnitude response of the RX reference node, determine a reciprocity calibration based on a phase difference between the TX and RX phase responses and a magnitude difference between the TX and RX magnitude responses, and apply the reciprocity calibration to the beam definitions to correct for the phase and magnitude differences.

In another embodiment, a method of operation of a hybrid MIMO system comprising a first number (N) of digital transceiver chains, N analog beamformers, and a calibration transceiver is provided. The method comprises the steps of, for each analog beamformer, measuring, using a corresponding digital transceiver chain and the calibration transceiver, a transmitter (TX) phase response and a TX magnitude response of a TX reference node of the analog beamformer and a receiver (RX) phase response and an RX magnitude response of an RX reference node of the analog beamformer, wherein each analog beamformer comprises a second number (M) of analog TX chains and M analog RX chains, one of the analog RX chains is the RX reference node, and one of the analog TX chains is the TX reference node. The method further comprises determining a reciprocity calibration for each analog beamformer based on a phase difference between the TX and RX phase responses and a magnitude difference between the TX and RX magnitude responses, and applying the reciprocity calibration to stored beam definitions of each analog beamformer to correct for the phase and magnitude differences.

In another embodiment, a non-transitory computer-readable medium is provided. The non-transitory computer-readable medium is configured to store instructions that, when executed by a processor, cause a hybrid MIMO system comprising a first number (N) of digital transceiver chains, N analog beamformers, and a calibration transceiver, to, for each analog beamformer, measure, using a corresponding digital transceiver chain and the calibration transceiver, a transmitter (TX) phase response and a TX magnitude response of a TX reference node of the analog beamformer and a receiver (RX) phase response and an RX magnitude response of an RX reference node of the analog beamformer, wherein each analog beamformer comprises a second number (M) of analog TX chains and M analog RX chains, one of the analog RX chains is the RX reference node, and one of the analog TX chains is the TX reference node. The instructions further cause the hybrid MIMO system to determine a reciprocity calibration for each analog beamformer based on a phase difference between the TX and RX phase responses and a magnitude difference between the TX and RX magnitude responses, and apply the reciprocity calibration to stored beam definitions of each analog beamformer to correct for the phase and magnitude differences.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that Massive MIMO Time Division Duplex (TDD) base stations rely on channel reciprocity to efficiently acquire downlink (DL) channel state information (CSI) through sounding signals in the uplink (UL) for multi-user MIMO precoding operation. Gain and phase offset between the base station transmitter and receiver chains breaks the reciprocity. In order to maintain downlink and uplink reciprocity, reciprocity calibration is typically performed regularly during the normal operation of the base station through a calibration network.

When analog beamforming circuits are added on top of a digital beamforming system in a base station, the combination of digital and analog beamforming is known as a hybrid massive MIMO base station system. The analog beamformer provides additional beamforming gain in the transmit and receive paths to achieve a higher link budget. However, since multiple RF components such as power amplifiers (PAs), low noise amplifiers (LNAs), phase shifters, and filters are used in the analog beamformer, the complexity of the reciprocity calibration increases drastically.

Accordingly, embodiments of the present disclosure provide a methodology for performing reciprocity calibration in a hybrid MIMO system by hierarchical calibration of the analog beamformers followed by correction for the reciprocity error, as well as an architecture that reduces the reciprocity calibration circuitry requirements to scale with the number of digital ports rather than the number of analog antenna ports.

Figure 1:
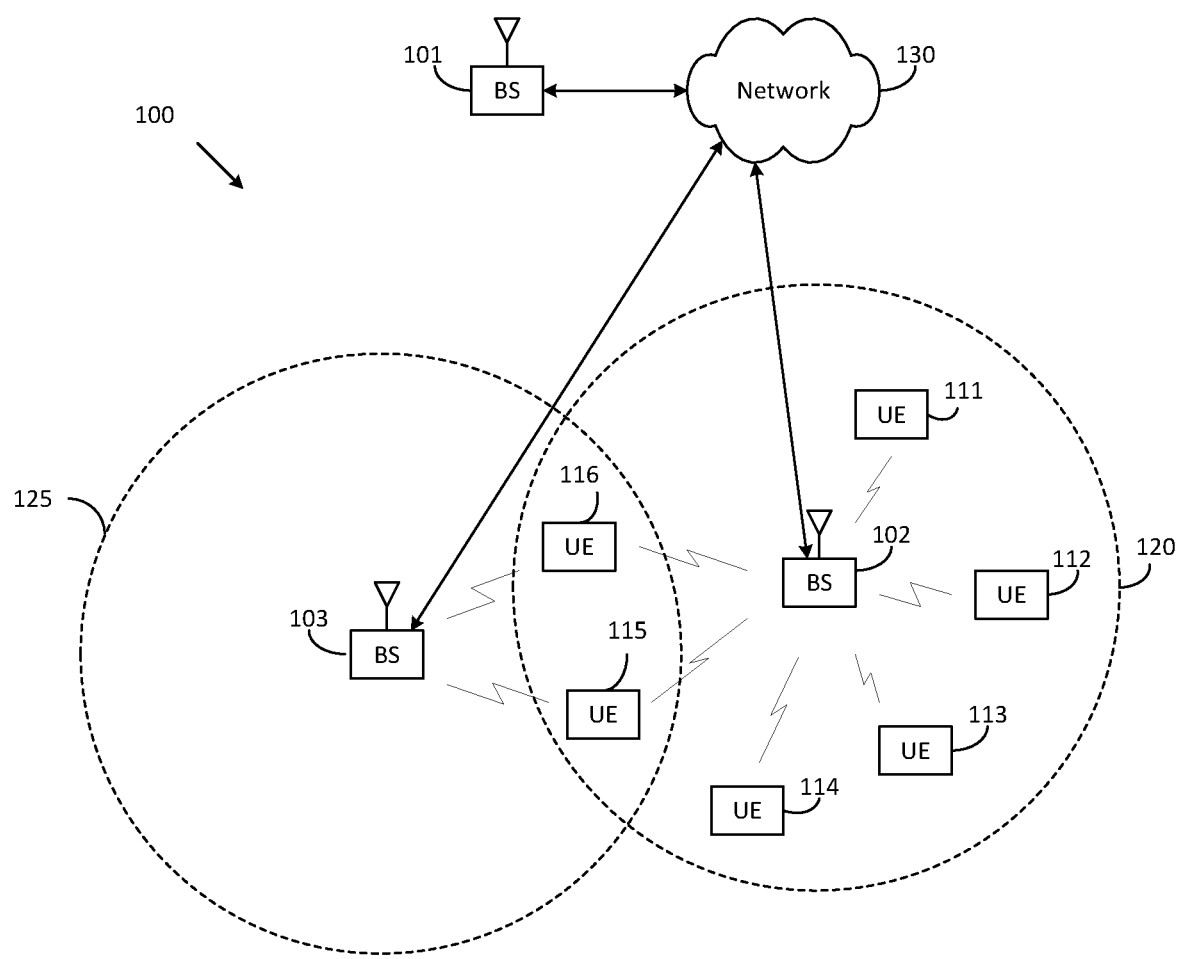
FIG. 1 illustrates an example wireless network according to various embodiments of the present disclosure.
Figure 2:
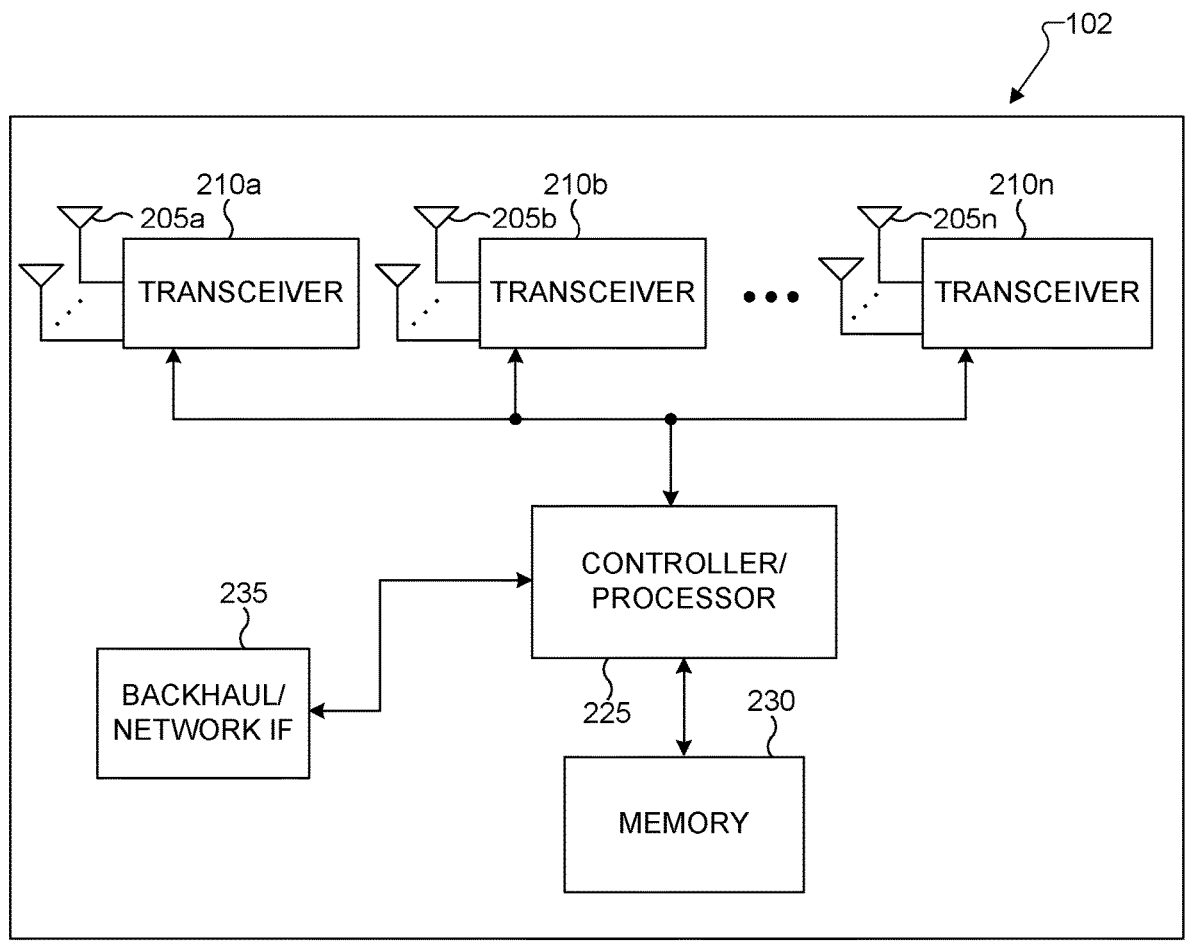
FIG. 2 illustrates an example gNB according to embodiments of the present disclosure.
Figure 3:
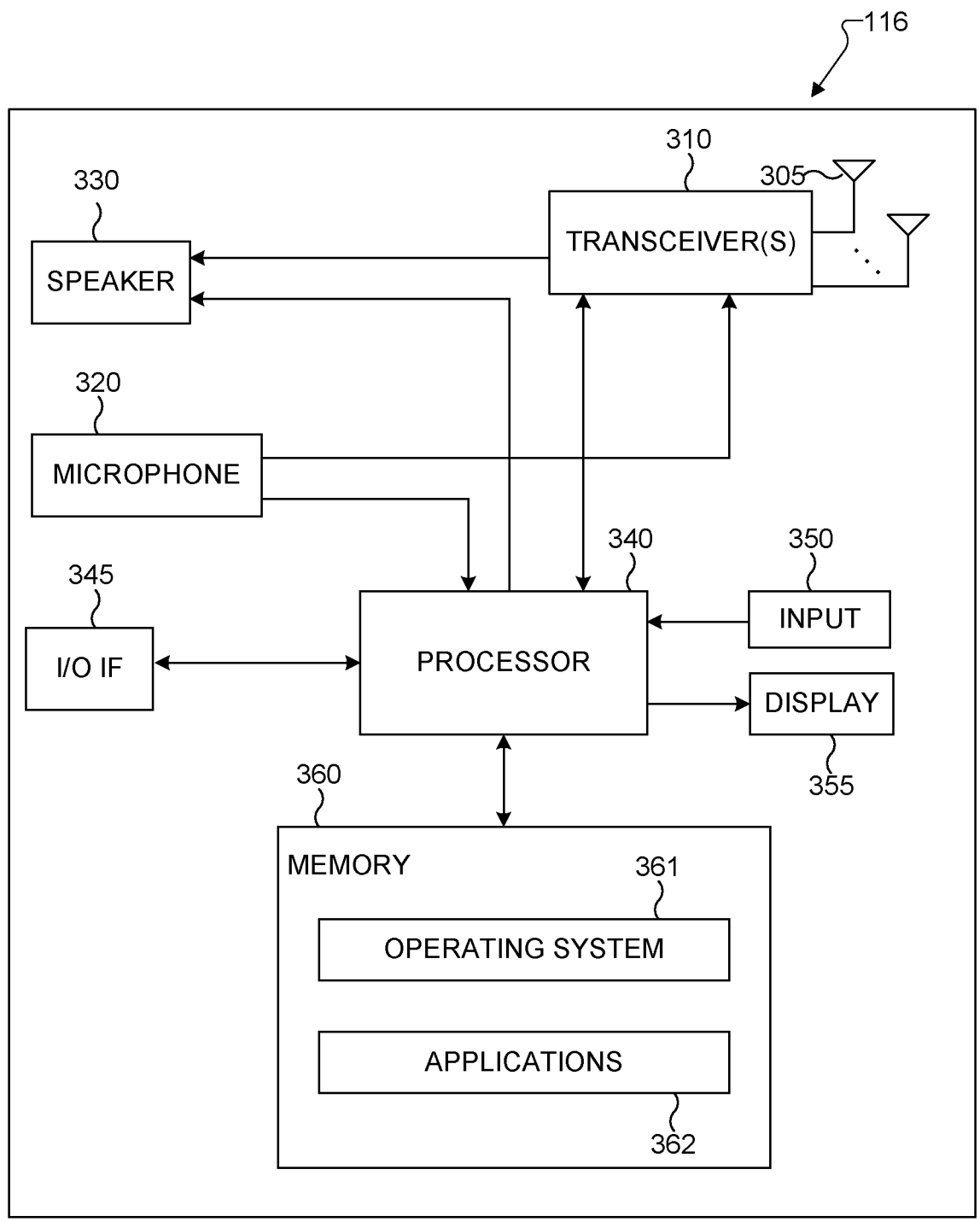
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
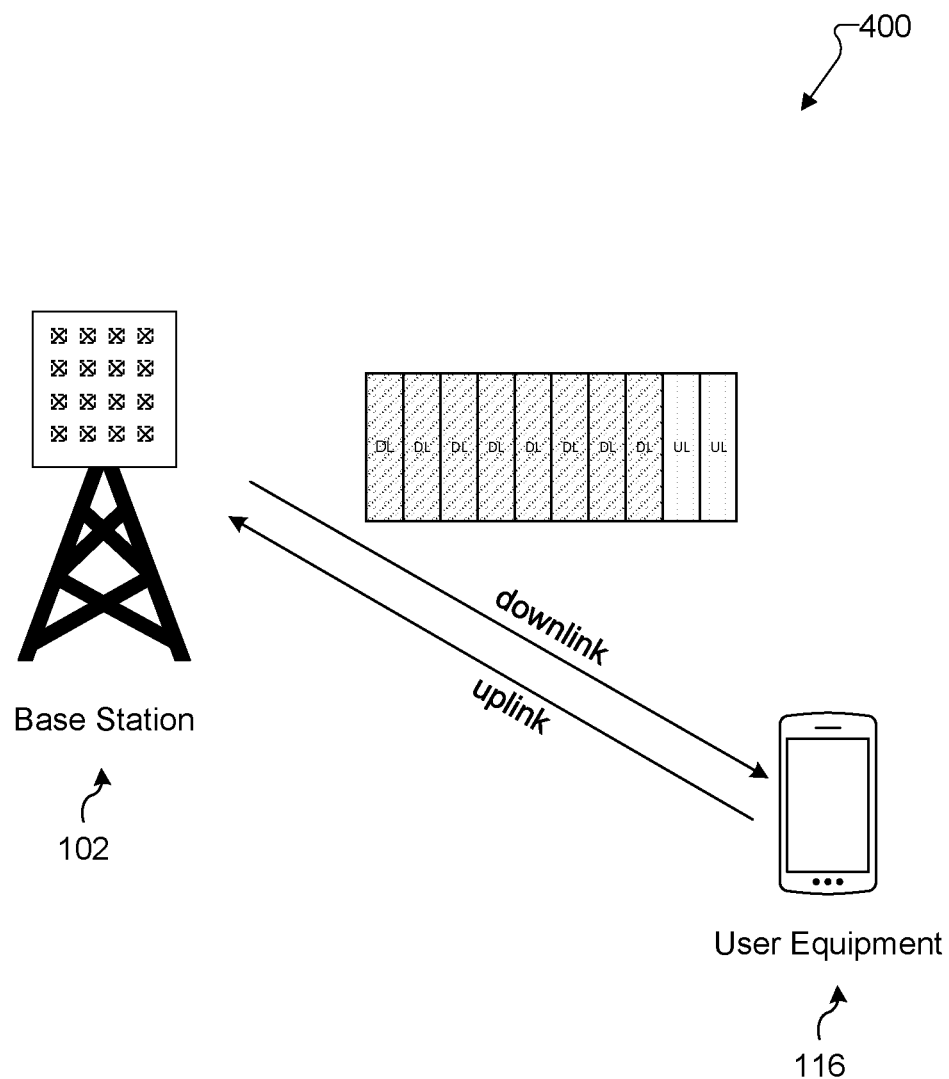
FIG. 4 illustrates an example massive MIMO system according to embodiments of the present disclosure.

FIG. 4 illustrates an example massive MIMO system 400 according to embodiments of the present disclosure. Massive MIMO systems typically operate in TDD, where the DL and UL operate in distinct time slots with the same carrier frequency. By operating in TDD, the base station (e.g., a gNB 102) can collect CSI during the uplink transmission from a UE (e.g., UE 116) and use this to aid in multi-user interference suppression via precoding in the downlink transmission to the UE. This is possible due to the reciprocal nature of the RF channel.

Figure 5A:
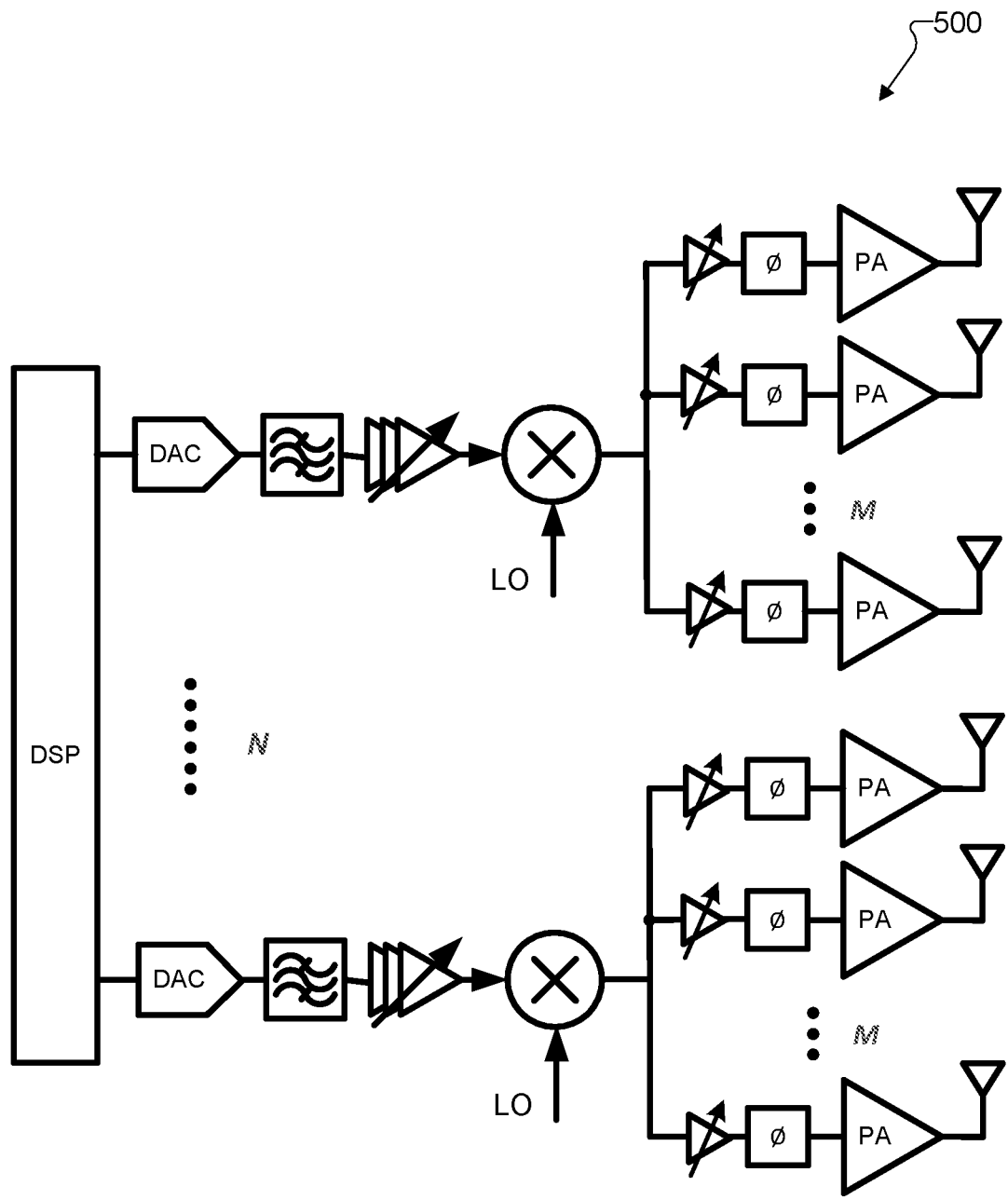
FIGS. 5A and 5B illustrate examples of a partially connected hybrid MIMO TX system and a partially connected hybrid MIMO RX system, respectively, according to embodiments of the present disclosure.
Figure 5B:
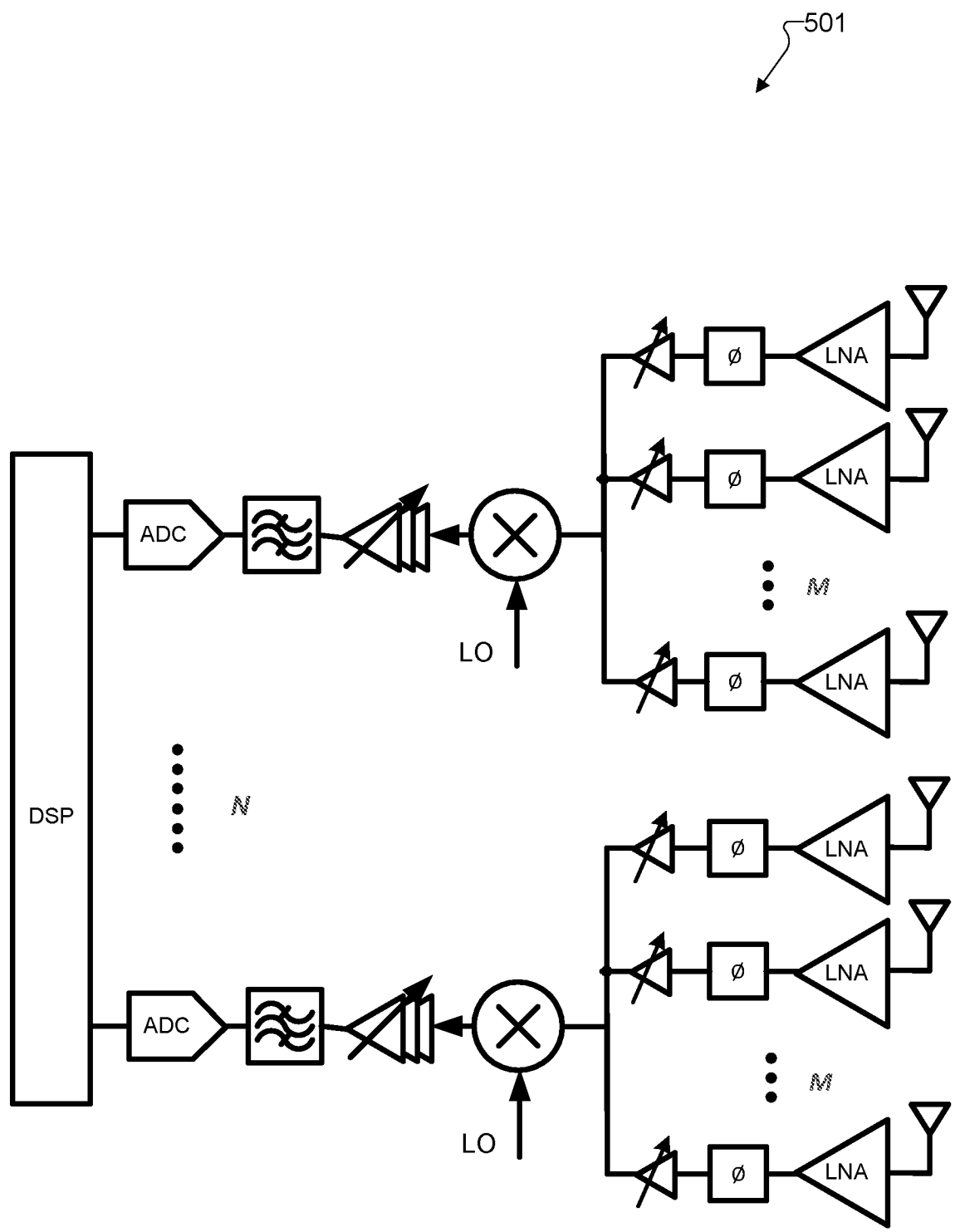

FIGS. 5A and 5B illustrate examples of a partially connected hybrid MIMO TX system 500 and a partially connected hybrid MIMO RX system 501, respectively, according to embodiments of the present disclosure. The digital portion of the system has N DACs and N ADCs each connected to an analog beamformer with M antenna elements.

In the hybrid TX system 500, the DAC produces an analog signal at some intermediate frequency (IF). The IF output goes through filter and gain stages before being upconverted to RF. At the analog beamformer, the signal is split M-ways to go through variable-gain amplifiers (VGA) and phase shifters as well as a primary PA before transmission over an antenna. Similarly, in the hybrid RX system 501 over-the-air (OTA) received signals from an antenna go through a low-noise amplifier (LNA) before going through VGAs and phase shifters. These signals are combined before being downconverted from RF to IF where additional circuitry may exist for additional gain control and filtering before measurements by an ADC.

In both of these hybrid MIMO systems, since multiple RF components such as PAs, LNAs, phase shifters, and filters are used in the analog beamformer, the complexity of the reciprocity calibration increases drastically as compared to a digital MIMO system (from N digital TX/RX chains to N*M chains, where M is the number of analog chains per digital chain). To address this, the present disclosure provides a hierarchical 2 step reciprocity calibration method. First, there is standard analog beamforming calibration referred to as Step 1. Then, a reduced complexity, global reciprocity calibration is introduced and referred to as Step 2. In this step reciprocity calibration is performed on N ports rather than the full N*M ports.

The hierarchical reciprocity calibration method of the present disclosure is based on a model hybrid MIMO system with N digital TX and RX chains (which may be combined into digital transceivers (TRX)), each connected to an independent analog TX or RX phased array with M antenna elements. Each element in the phased array has a gain from a VGA and phase from a phase shifter. The gain and phase are respectively denoted as $a_{i,j}$ and $\theta_{i,j}$ for the $j^{th}$ phased array element of the $i^{th}$ TX phased array. Similarly, $b_{i,j}$ and $\phi_{i,j}$ represent the gain and phase of the $j^{th}$ phased array element of the $i^{th}$ RX phased array. The a, b, $\theta$, and $\phi$ values can comprise independently controllable gain and phase components as well as some natural phase shift and gain.

The controllable gain and phase components may be controlled to a level of precision determined by the bit resolution of the respective VGA or phase shifter so that there are finite sets of possible weights for the gain and phase denoted as L and K, respectively. $a_{i,j}[l]$ and $b_{i,j}[l]$ represent the value of the gain of each TX and RX analog chain, respectively, when selecting the $l^{th}$ gain value (or gain ID) out of the set of all possible values L, and $\theta_{i,j}[k]$ and $\phi_{i,j}[k]$ represent the value of the phase of each TX and RX analog chain, respectively, when selecting the $k^{th}$ phase value (or phase ID) out of the set of all possible values K. A set of M pairs of gain and phase settings corresponds to a beam. For example, $k_1=\{0, 10, 20, 30\}$ and $l_1=\{10, 11, 12, 9\}$ could represent a beam in a codebook for TRX i=1 with M=4 analog antenna elements. Each element in $k_1$, $l_1$ corresponds to an antenna element in the beamformer and which phase ID and gain ID to utilize to construct the beam. These settings are chosen to create a certain desirable array response. An analog beamformer may store settings for B reprogrammable beams in an onboard memory for quick access and switching.

In Step 1 of the hierarchical reciprocity calibration, each analog beamformer performs an over-the-air (OTA) beamforming calibration to measure the array response. The phase shift and gain settings for each TX and RX chain are stored in a first table of the beamformer memory as the beamforming calibration setting. This is typically a one-time calibration which may be performed at the time of manufacture.

Figure 6A:
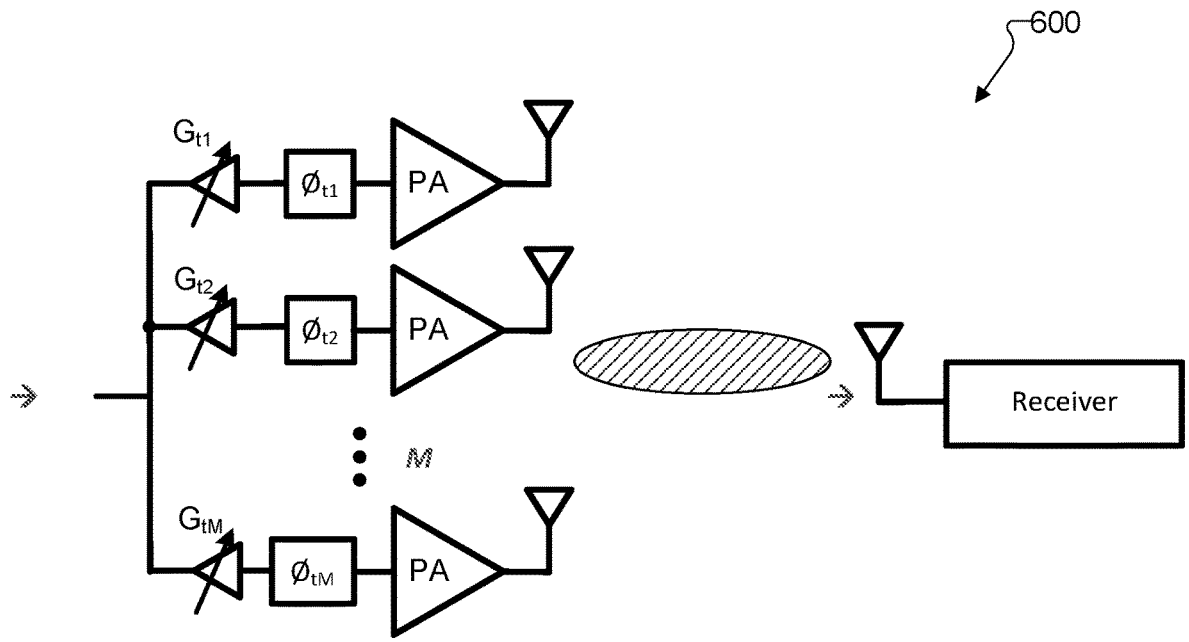
FIGS. 6A and 6B illustrate examples of OTA beamforming calibration processes for a TX beamformer and for an RX beamformer, respectively, according to embodiments of the present disclosure.
Figure 6B:
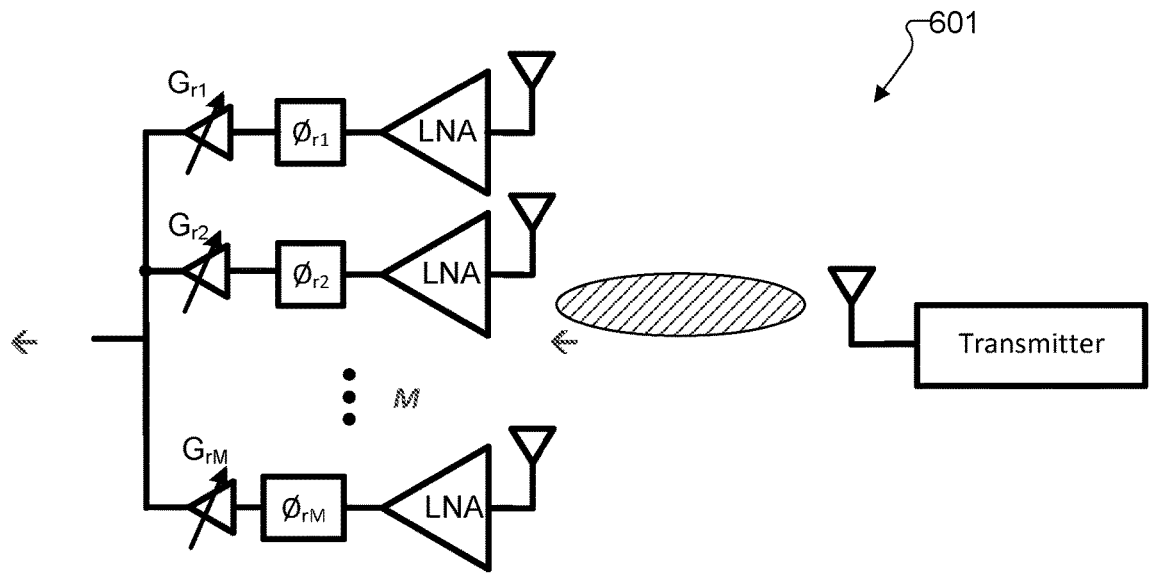

FIGS. 6A and 6B illustrate examples of OTA beamforming calibration processes for a TX beamformer 600 and for an RX beamformer 601, respectively, according to embodiments of the present disclosure. With reference to FIG. 6A, one of the antenna elements of the analog beamformer subarray is chosen as a reference node for calibration. A receiver is then placed boresight to the subarray. Cycling through each antenna element pairwise, the responses are measured and compared to the reference element. Upon compositing the measurements, the phase shift value for each element that maximizes or minimizes the composite can be determined, thus aligning the phase shifts for each element in the beamformer. Similarly for the RX beamformer 601, the RX paths are aligned pairwise using a boresight transmitter and measuring the RX composite from the analog beamformer.

Using the first analog subarray/beamformer i=1 as an example, the first TX chain element j=1 may be selected as the reference node with reference phase ID k=0. The reference node element has a response $a_{1,1}[0]\angle\theta_{1,1}[0]$. For each of the other elements in the M-size subarray, the K phase ID values are iterated through, and the phase ID $\hat{k}$ that minimizes the boresight response for each element is found. This process can also be expressed as $\widehat{k_{1,j}}=\operatorname{argmin}_k a_{1,1}[0]\angle\theta_{1,1}[0]+a_{1,j}[0]\angle\theta_{1,j}[k]$. For a given beam codebook of B beams, each antenna element gets a beam calibration phase offset based on the learned values of $\widehat{k_{1,j}}$.

The codebook is similarly calibrated for the gain offsets. These values are stored in the first beamformer table.

In Step 2 of the hierarchical reciprocity calibration, a global reciprocity calibration is performed using a calibration network that connects the reference nodes of the analog beamformers to a calibration transceiver—i.e., all the reference TX nodes are measured using a calibration receiver, and all the reference RX nodes are measured using a calibration transmitter. The phase shifters and VGAs are adjusted to align and match all the TX branches and RX branches separately—that is, each TX subarray i is aligned with the corresponding RX subarray i. The gain and phase settings from the first beamformer table are scaled proportionally by the phase shift and gain changes. The adjusted phase shift and gain values are stored in a second beamformer table.

Figure 7A:
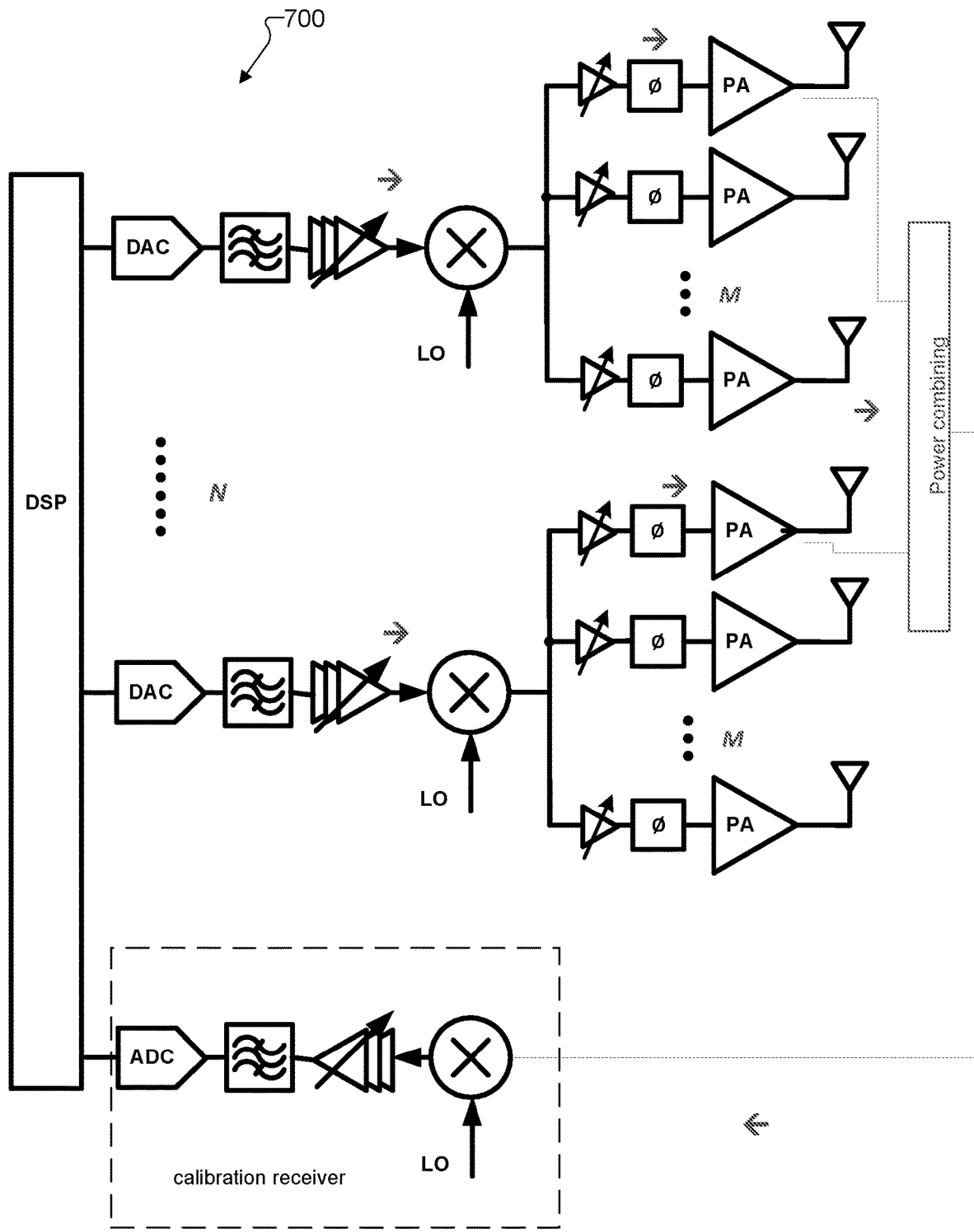
FIGS. 7A and 7B illustrate examples of global reciprocity calibration for the TX system and RX system, respectively, according to embodiments of the present disclosure.
Figure 7B:
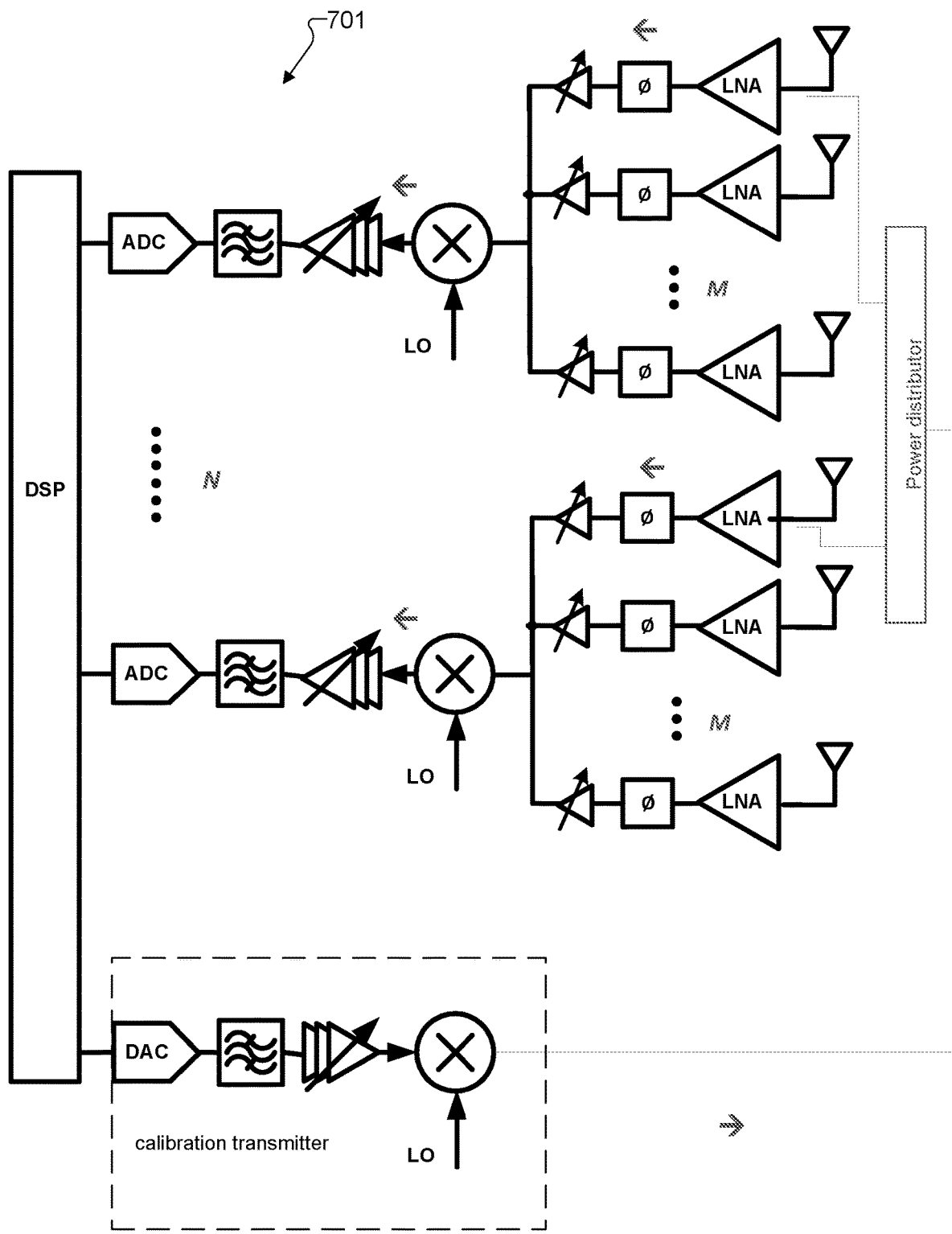

FIGS. 7A and 7B illustrate examples of global reciprocity calibration for the TX system 700 and RX system 701, respectively, according to embodiments of the present disclosure. With reference to FIG. 7A, TX reciprocity calibration measurement is performed by sounding and measuring a reference node for each subarray using a common calibration receiver. Similarly, in FIG. 7B, RX reciprocity calibration measurement is performed by sounding a reference RX path through a reference node for each subarray using a common calibration transmitter. After measuring the difference in the phase response between each of the TX reference nodes and each of the RX reference nodes, a calibration value can be determined and applied to the first beamformer table, creating the second beamformer table. In some embodiments, the second beamformer table may be stored as an update to the first beamformer table—that is, only a single beamformer table may be stored.

Using the first analog subarray/beamformer i=1 as an example, the calibration network is used to measure the reciprocity error on the reference node (in this example, j=1). This may be expressed as $$r_{1,1}[l, k] = \frac{a_{1,1}[l] \angle \theta_{1,1}[k]}{b_{1,1}[l] \angle \phi_{1,1}[k]}.$$

The angle of $r_{1,1}[l, k]$ may be used to update the phase shift values of the first beamformer table by offsetting either the TX or RX phase shift settings by a corresponding amount. Similarly, the magnitude of $r_{1,1}[l, k]$ may be used to update the gain values of the first beamformer table.

According to the above embodiments, during normal operation the base station will set the analog beam using the second beamformer table from the beam codebook for each beamformer. This codebook based on the second beamformer table can be used for some period before needing to be updated, due to the natural drift in phase relationship between the components. After such as period has passed, Step 2 may be repeated to update the second beamformer table again.

Examples of the first and second beamformer tables for a given analog subarray/beamformer are shown below. After Step 1, Table 1 is populated where the phase shifter and VGA settings shown in each of the table cells represent a set of settings for all M elements to yield the desired TX and RX beam pattern for the corresponding beam index—that is, Table 1 represents a beam codebook for one analog subarray/beamformer after Step 1 OTA beamformer calibration. After Step 1, each beam index in the TX and RX portions of the table yield similar patterns, but likely have a phase and gain offset (i.e., a reciprocity error) relative to each other. In Step 2, these offsets are learned and applied to Table 1, creating Table 2—that is, Table 2 represents a beam codebook for the analog subarray/beamformer after Step 2 reciprocity calibration.

TABLE 1

| Beam # | Phase shifter setting | VGA setting |
|---|---|---|
| 1 | TX phase setting set 1 | TX gain setting set 1 |
| 2 | TX phase set 2 | TX gain set 2 |
| 3 | TX phase set 3 | TX gain set 3 |
| ... | ... | ... |
| B | TX phase set B | TX gain set K |
| 1 | RX phase set 1 | RX gain set 1 |
| 2 | RX phase set 2 | RX gain set 2 |
| 3 | RX phase set 3 | RX gain set 3 |
| ... | ... | ... |
| B | RX phase set B | RX gain set K |

TABLE 2

| Beam # | Phase shifter setting | VGA setting |
|---|---|---|
| 1 | Shifted TX phase set 1 | Scaled TX gain set 1 |
| 2 | Shifted TX phase set 2 | Scaled TX gain set 2 |
| 3 | Shifted TX phase set 3 | Scaled TX gain set 3 |
| ... | ... | ... |
| B | Shifted TX phase set B | Scaled TX gain set K |
| 1 | Shifted RX phase set 1 | Scaled RX gain set 1 |
| 2 | Shifted RX phase set 2 | Scaled RX gain set 2 |
| 3 | Shifted RX phase set 3 | Scaled RX gain set 3 |
| ... | ... | ... |
| B | Shifted RX phase set B | Scaled RX gain set B |

Figure 8:
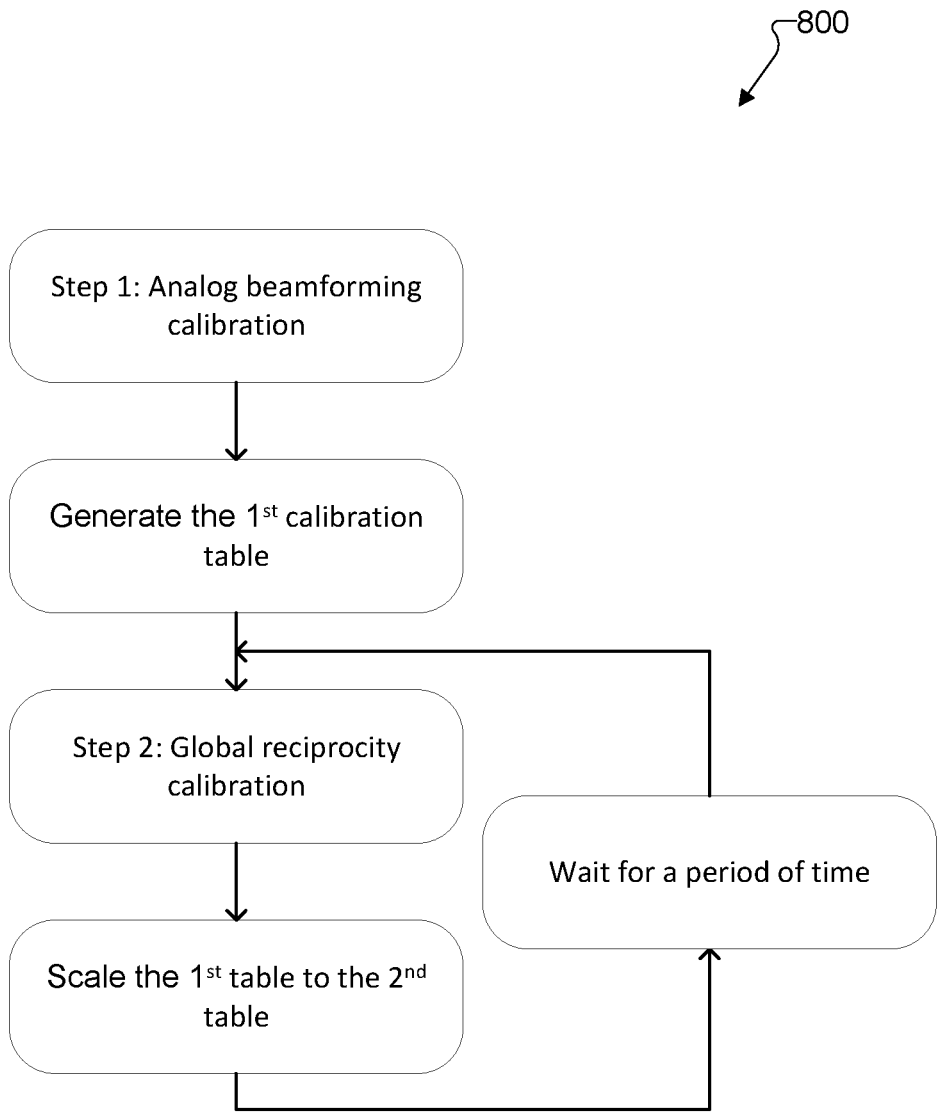
FIG. 8 illustrates an example process for hierarchical reciprocity calibration of a hybrid MIMO system according to embodiments of the present disclosure.

FIG. 8 illustrates an example process 800 for hierarchical reciprocity calibration of a hybrid MIMO system according to embodiments of the present disclosure. First, the analog beamforming calibration is done to create Table 1. The relative beamforming weights within an analog beamformer typically do not change so this process does not typically need to be repeated. While the BS is deployed, reciprocity calibration needs to be performed repeatedly at some period (typically on the order of minutes). The Step 2 reciprocity calibration may drift over time due to natural shifts due to temperature changes and other effects.

Figure 9:
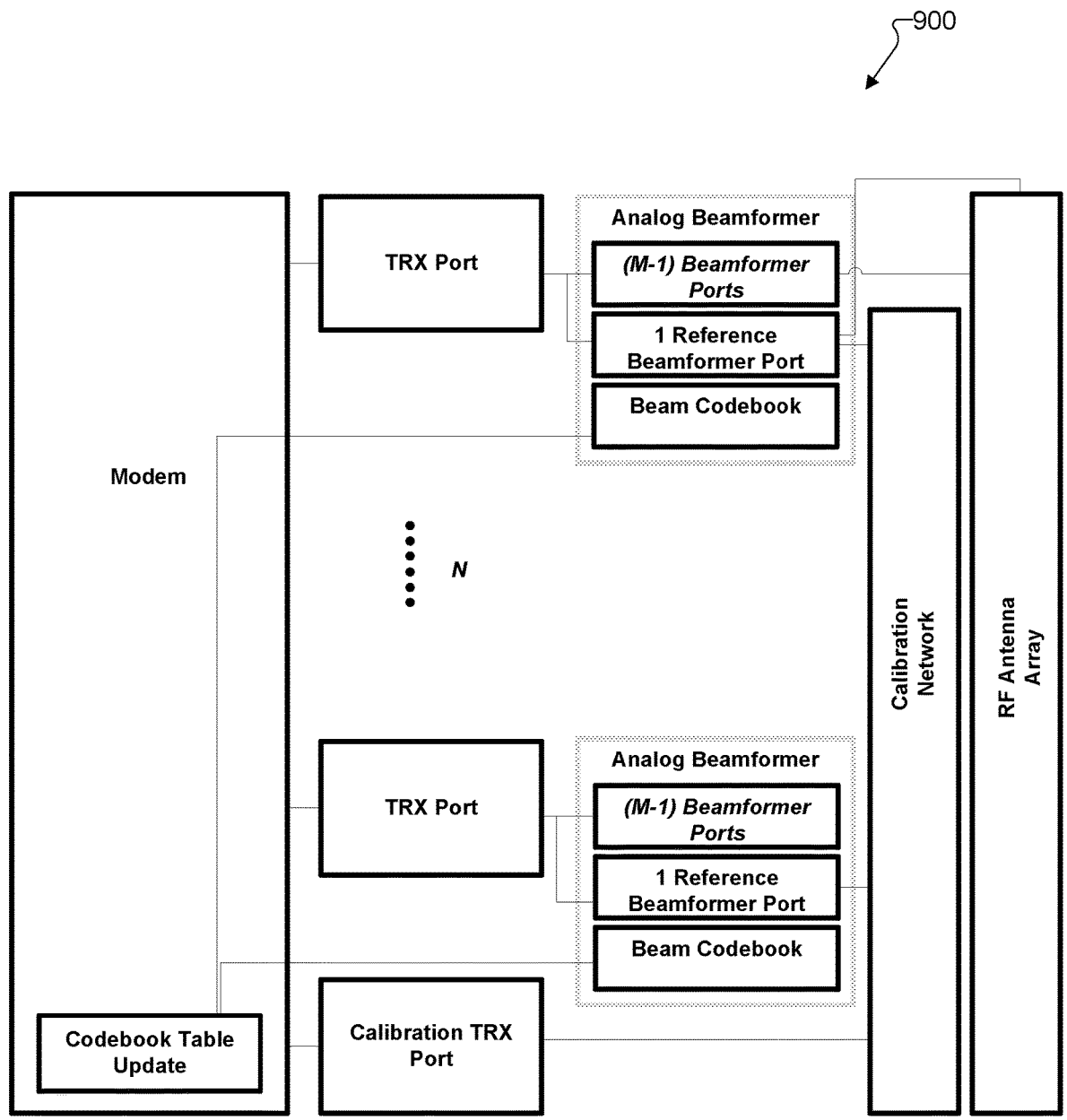
FIG. 9 illustrates an example block diagram of a hybrid MIMO system with hierarchical reciprocity calibration according to embodiments of the present disclosure.

FIG. 9 illustrates an example block diagram of a hybrid MIMO system 900 with hierarchical reciprocity calibration according to embodiments of the present disclosure. There are N digital TRX ports that are connected to a modem for transmitting and receiving IQ data. These TRX ports are each also connected to a corresponding analog beamformer with M ports. One port is used as a reference node in Step 1 and Step 2. Each analog beamformer also contains a table known as the beam codebook which contains phase shift values for each element for B predetermined beams. The modem may select which beam to use at any given time and the beam codebook may be rewritten by the "Codebook Table Update" block within the modem. The reference port of each analog beamformer is connected to the calibration network which is also connected to a digital calibration TRX port which is connected to the modem. The modem will periodically sound each the TX and RX on each of the reference ports on the analog beamformers using the calibration TRX port. Based on the results, an update to the codebook may be computed and stored back in the beam codebooks on each analog beamformer.

Various embodiments of the present disclosure incorporate the above hierarchical reciprocity calibration into different possible realizations of the hybrid MIMO architecture. In these embodiments, all possible permutations of the components of the TX and RX chains as well as any commonplace transmitter/receiver architecture may be included. This includes systems that are direct RF with no LO for IF to RF conversion. This also includes systems with DACs and ADCs for the real and imaginary components of a baseband waveform where the LOs for each are separated by 90 degrees.

Figure 10:
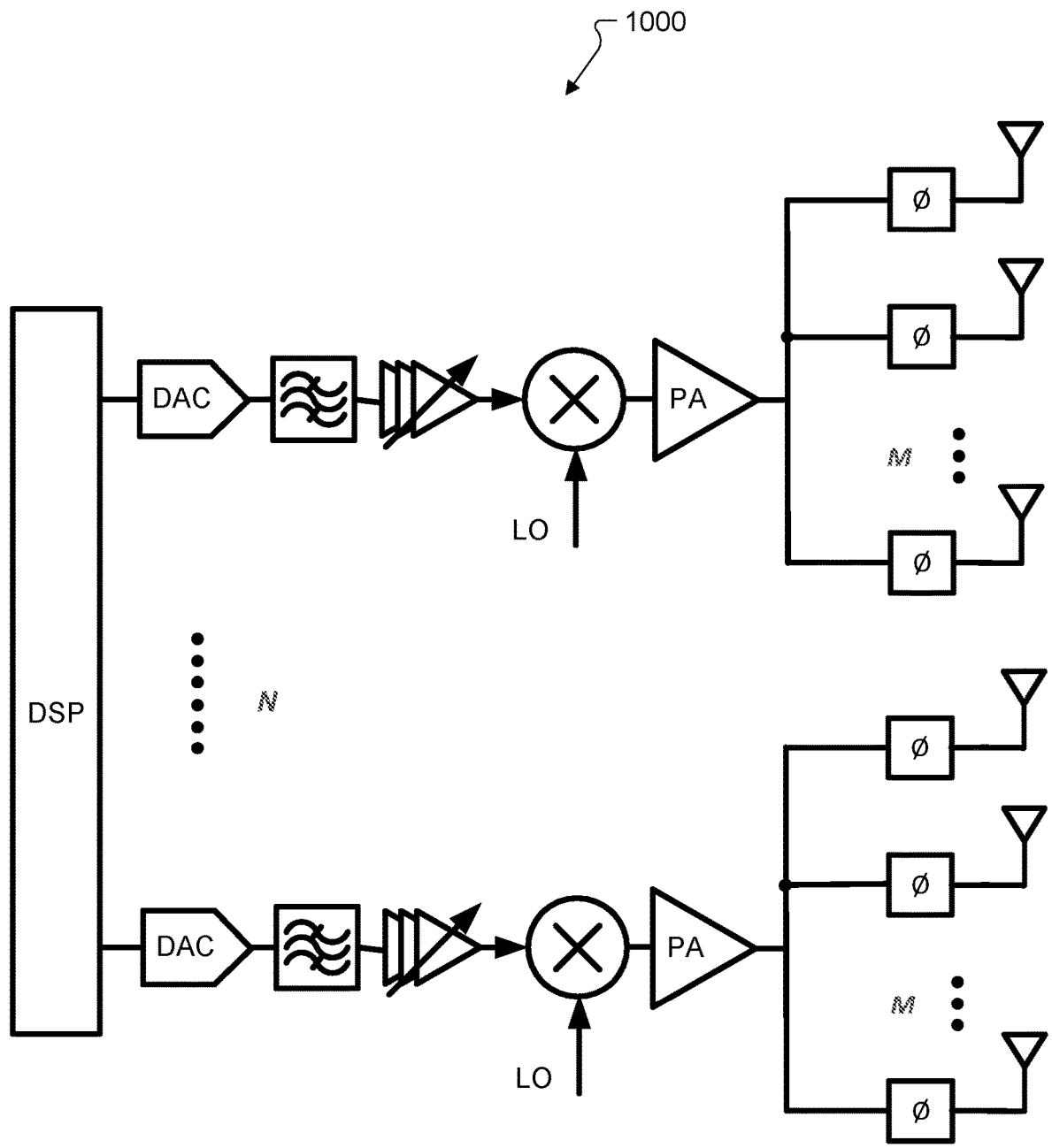
FIG. 10 illustrates an example hybrid MIMO system according to embodiments of the present disclosure.

FIG. 10 illustrates an example hybrid MIMO system 1000 according to embodiments of the present disclosure. The hybrid MIMO system 1000 includes a single larger PA in the TX chain before the analog beamformer rather than a PA for each antenna element of each TX beamformer. Likewise, for the RX portion of the hybrid MIMO system 1000 there may be a single LNA per RX chain after the analog beamformer.

Figure 11A:
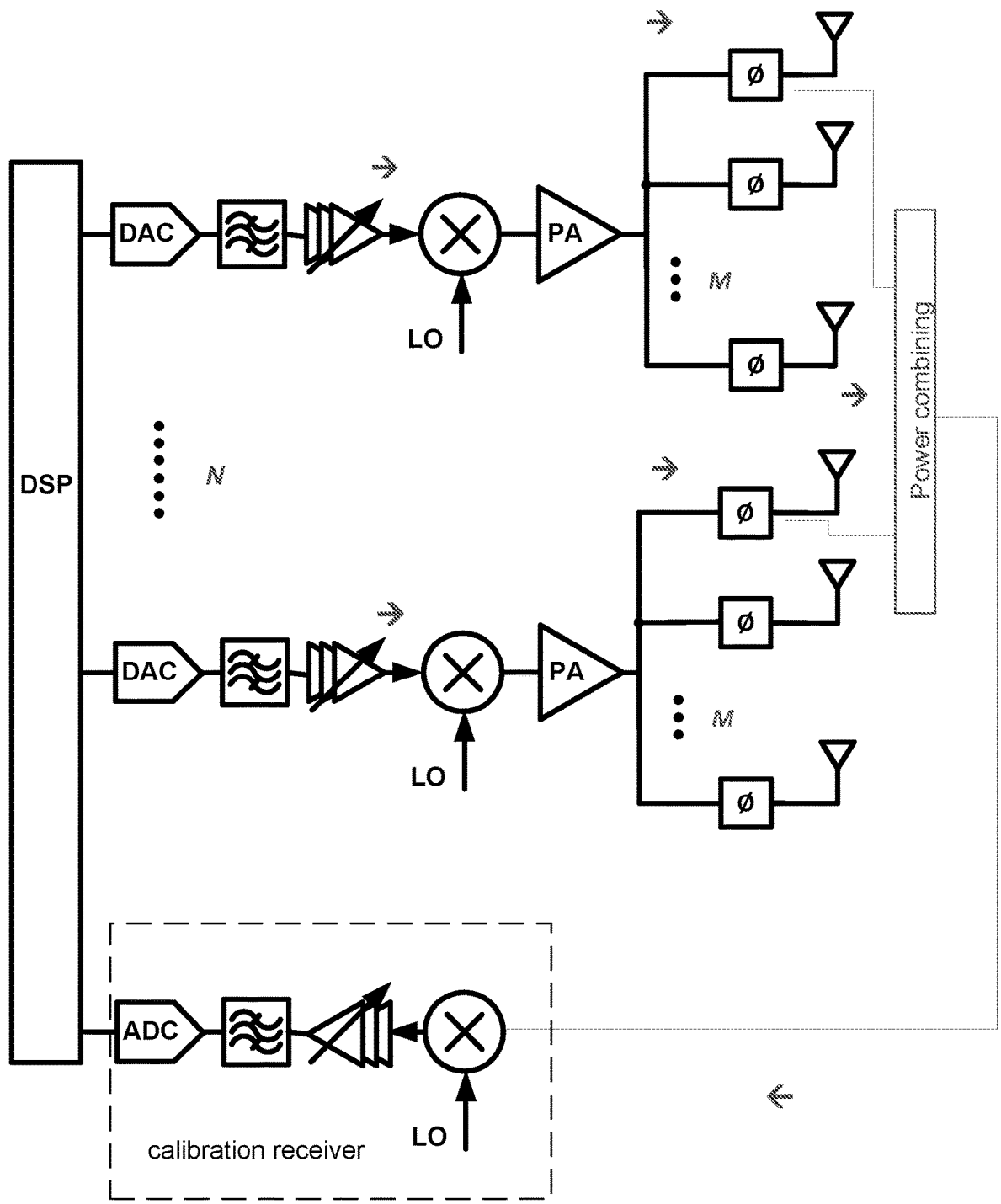
FIGS. 11A and 11B illustrate examples of global TX reciprocity calibration and global RX reciprocity calibration, respectively, for the hybrid MIMO system, according to embodiments of the present disclosure.
Figure 11B:
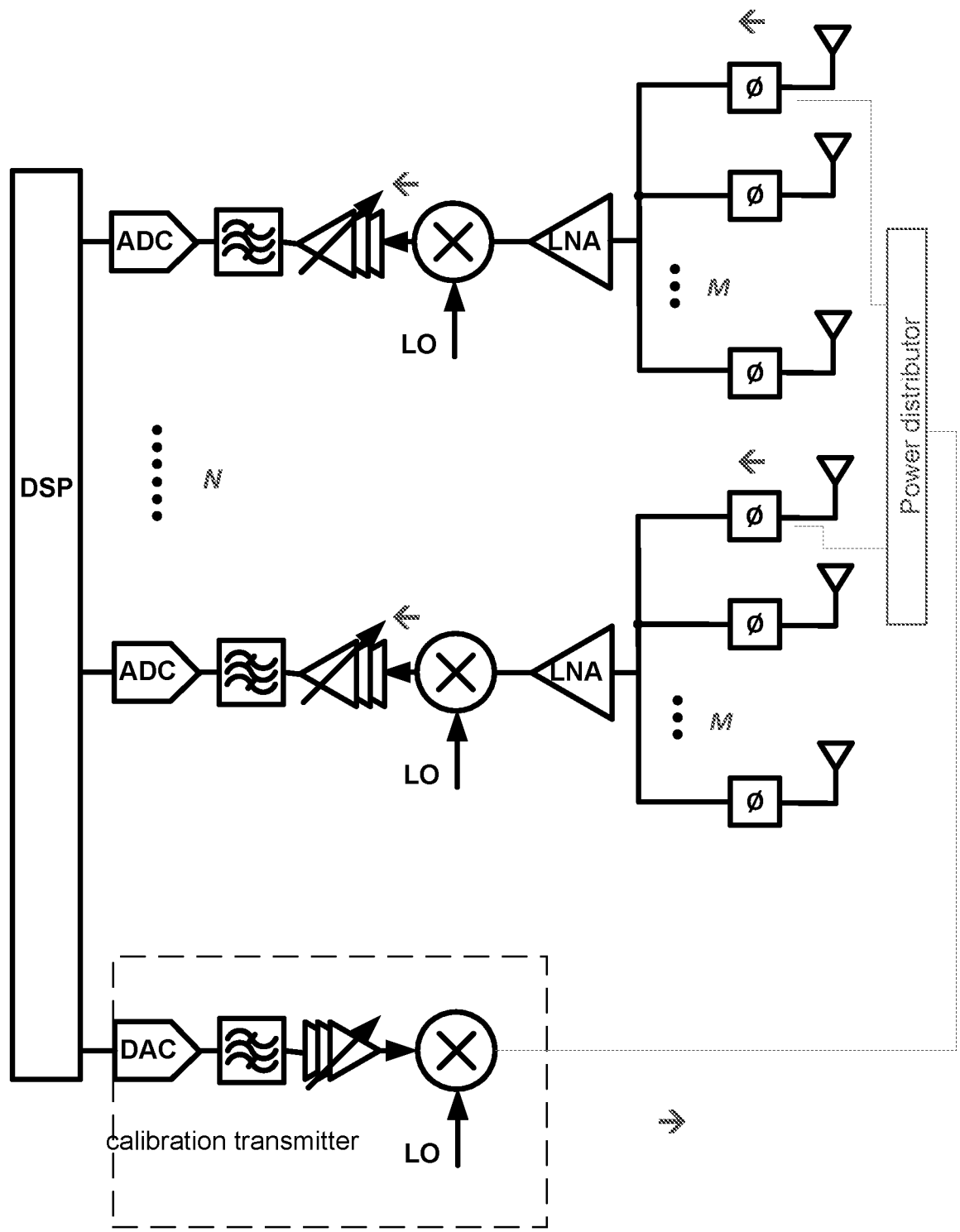

FIGS. 11A and 11B illustrate examples of global TX reciprocity calibration and global RX reciprocity calibration, respectively, for the hybrid MIMO system 1000, according to embodiments of the present disclosure. The calibration steps are carried out identically to the above embodiments. In FIG. 11A, Step 2 of the calibration process is illustrated, wherein a single reference element from each subarray is measured through a calibration receiver. FIG. 11B illustrates the corresponding process for the receiver architecture, where one reference element from each subarray is sounded by a calibration transmitter.

In another embodiment, the TX and RX branches share common phase shifters and VGA circuitry. In another embodiment, each analog beamformer has additional circuitry to connect to each TRX chain. This is known as a fully connected hybrid beamformer. In another embodiment, the Step 1 codebook is measured using non-OTA methods such as dedicated circuitry or instrumentation such as a vector network analyzer (VNA). In another embodiment, the calibration values from Step 2 are not applied to the Table 1 codebook to create Table 2. Instead, the calibration values are maintained separately as digital calibration weights.

Figure 12:
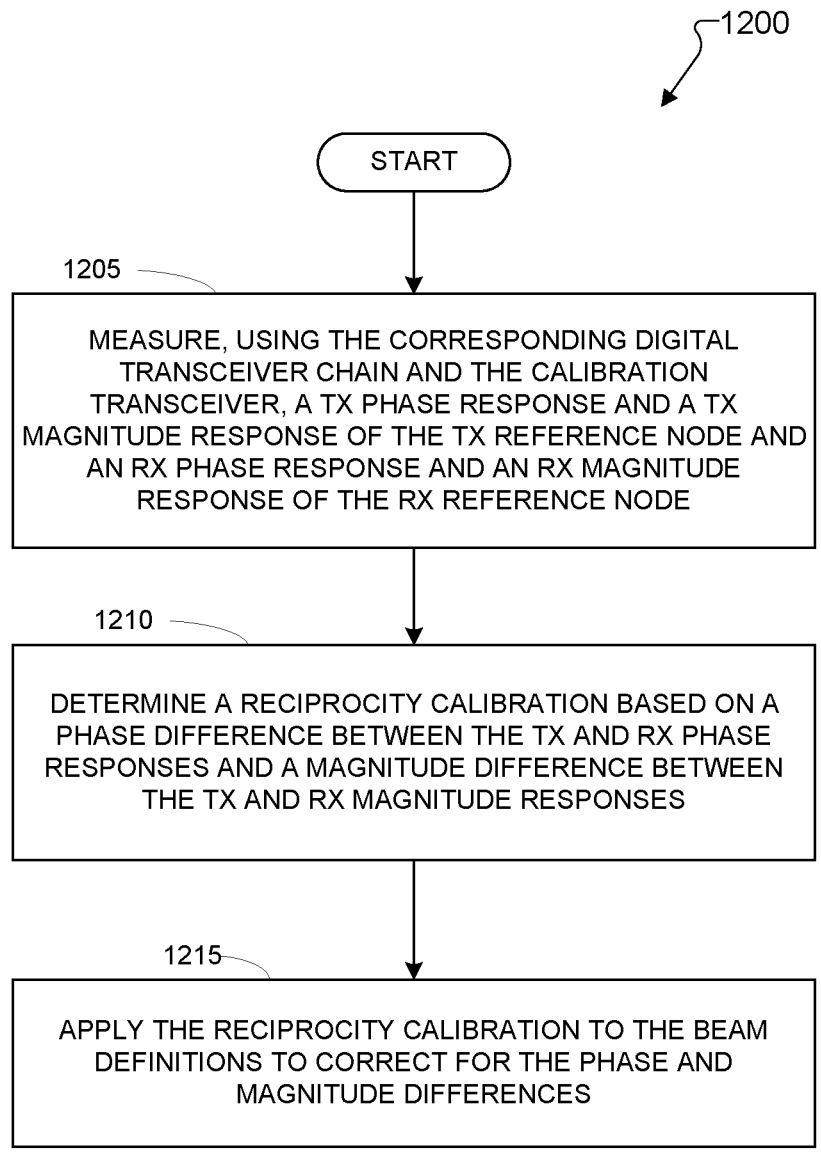
FIG. 12 illustrates an example process for performing a hierarchical global reciprocity calibration in a hybrid MIMO system according to various embodiments of the present disclosure.

FIG. 12 illustrates an example process 1200 for performing a hierarchical global reciprocity calibration in a hybrid MIMO system according to various embodiments of the present disclosure. The process 1200 of FIG. 12 is performed by a device that is equipped with a hybrid MIMO system comprising a first number (N) of digital transceiver chains, N analog beamformers, each operably coupled to a respective one of the digital transceiver chains, a calibration transceiver, and a processor. Each analog beamformer comprises a second number (M) of analog transmitter (TX) chains and M analog receiver (RX) chains, wherein one of the analog RX chains is an RX reference node and one of the analog TX chains is a TX reference node, and a memory that is operably coupled to the analog TX chains and to the analog RX chains and is configured to store beam definitions. The calibration transceiver is operably coupled to the TX reference node and the RX reference node of each of the analog beamformers. The processor is operably coupled to the calibration transceiver, the digital transceiver chains, and the analog beamformers. The process 1200 of FIG. 12 may performed by a 5G/NR base station (e.g., a gNB 102) or by any other suitable wireless communication device (e.g., 6G and beyond base stations).

The process 1200 begins at step 1205, where for each analog beamformer the device measures, using the corresponding digital transceiver chain and the calibration transceiver, a TX phase response and a TX magnitude response of the TX reference node and an RX phase response and an RX magnitude response of the RX reference node. In some embodiments this is done by using the calibration transceiver to transmit a sounding signal to each RX reference node to generate the corresponding RX phase response at the corresponding digital transceiver chain, and using the calibration transceiver to receive a sounding signal from each TX reference node that is transmitted from the corresponding digital transceiver chain to generate the corresponding TX phase response.

The device next determines a reciprocity calibration for each analog beamformer based on a phase difference between the TX and RX phase responses and a magnitude difference between the TX and RX magnitude responses (step 1210). In some embodiments, each analog TX chain and each analog RX chain comprises a VGA and a phase shifter, and each beam definition comprises a gain setting for the VGA and a phase shift setting for the phase shifter of each analog TX chain or each analog RX chain. The device may, at step 1210, determine a phase shift offset that minimizes the phase difference between the TX and RX phase responses and a gain offset that minimizes the magnitude difference between the TX and RX magnitude responses as the reciprocity calibration.

The device then applies the reciprocity calibration for each analog beamformer to the stored beam definitions of the beamformer to correct for the phase and magnitude differences (step 1215). The device may, for either the beam definitions that comprise settings for the analog TX chains or the beam definitions that comprise settings for the analog RX chains, apply the phase shift offset to each phase shift setting and the gain offset to each gain setting as the reciprocity calibration.

The analog beamformer can then apply a selected one of the stored beam definitions to the analog TX chains to form a TX beam or to the analog RX chains to form an RX beam. The steps of process 1200 may be repeated periodically to update the stored beam definitions as the reciprocity calibration drifts.

In some embodiments, the beam definitions are initially generated based on an over-the-air beam calibration such that, for each analog beamformer, initial TX phase responses of each of the analog TX chains other than the TX reference node are aligned with an initial TX phase response of the TX reference node, the initial TX phase responses being measured at a boresight receiver that is located boresight to the TX reference node, and initial RX phase responses of each of the analog RX chains other than the RX reference node are aligned with an initial RX phase response of the RX reference node, the initial RX phase responses being measured based on transmissions from a boresight transmitter that is located boresight to the RX reference node.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A hybrid multiple-input multiple-output (MIMO) system comprising:
a first number (N) of digital transceiver chains;
N analog beamformers, each operably coupled to a respective one of the digital transceiver chains and comprising:
a second number (M) of analog transmitter (TX) chains and M analog receiver (RX) chains, wherein one of the analog RX chains is an RX reference node and one of the analog TX chains is a TX reference node, and
a memory that is operably coupled to the analog TX chains and to the analog RX chains and is configured to store beam definitions;
a calibration transceiver operably coupled to the TX reference node and the RX reference node of each of the analog beamformers; and
a processor operably coupled to the calibration transceiver, the digital transceiver chains, and the analog beamformers, the processor configured to, for each analog beamformer:
measure, using the corresponding digital transceiver chain and the calibration transceiver, a TX phase response and a TX magnitude response of the TX reference node and an RX phase response and an RX magnitude response of the RX reference node,
determine a reciprocity calibration based on a phase difference between the TX and RX phase responses and a magnitude difference between the TX and RX magnitude responses, and
apply the reciprocity calibration to the beam definitions to correct for the phase and magnitude differences.

2. The hybrid MIMO system of claim 1, wherein the calibration transceiver is configured to:
transmit a sounding signal to each RX reference node to generate the corresponding RX phase response at the corresponding digital transceiver chain, and
receive a sounding signal from each TX reference node that is transmitted from the corresponding digital transceiver chain to generate the corresponding TX phase response.

3. The hybrid MIMO system of claim 1, wherein:
each analog TX chain and each analog RX chain comprises a variable gain amplifier (VGA) and a phase shifter, and
each beam definition comprises a gain setting for the VGA and a phase shift setting for the phase shifter of each analog TX chain or each analog RX chain.

4. The hybrid MIMO system of claim 3, wherein the processor is further configured to, for each analog beamformer:
determine a phase shift offset that minimizes the phase difference between the TX and RX phase responses,
determine a gain offset that minimizes the magnitude difference between the TX and RX magnitude responses, and
for either the beam definitions that comprise settings for the analog TX chains or the beam definitions that comprise settings for the analog RX chains, apply the phase shift offset to each phase shift setting and the gain offset to each gain setting as the reciprocity calibration.

5. The hybrid MIMO system of claim 1, wherein the beam definitions are initially generated based on an over-the-air beam calibration such that, for each analog beamformer:
initial TX phase responses of each of the analog TX chains other than the TX reference node are aligned with an initial TX phase response of the TX reference node, the initial TX phase responses being measured at a boresight receiver that is located boresight to the TX reference node, and
initial RX phase responses of each of the analog RX chains other than the RX reference node are aligned with an initial RX phase response of the RX reference node, the initial RX phase responses being measured based on transmissions from a boresight transmitter that is located boresight to the RX reference node.

6. The hybrid MIMO system of claim 1, wherein the processor is further configured to periodically determine and apply the reciprocity calibration.

7. The hybrid MIMO system of claim 1, wherein the analog beamformer is configured to apply a selected one of the beam definitions to the analog TX chains to form a TX beam or to the analog RX chains to form an RX beam.

8. A method of operation of a hybrid multiple-input multiple-output (MIMO) system comprising a first number (N) of digital transceiver chains, N analog beamformers, and a calibration transceiver, the method comprising:
for each analog beamformer, measuring, using a corresponding digital transceiver chain and the calibration transceiver, a transmitter (TX) phase response and a TX magnitude response of a TX reference node of the analog beamformer and a receiver (RX) phase response and an RX magnitude response of an RX reference node of the analog beamformer, wherein each analog beamformer comprises a second number (M) of analog TX chains and M analog RX chains, one of the analog RX chains is the RX reference node, and one of the analog TX chains is the TX reference node;
determining a reciprocity calibration for each analog beamformer based on a phase difference between the TX and RX phase responses and a magnitude difference between the TX and RX magnitude responses; and
applying the reciprocity calibration to stored beam definitions of each analog beamformer to correct for the phase and magnitude differences.

9. The method of claim 8, further comprising:
transmitting, using the calibration transceiver, a sounding signal to each RX reference node to generate the corresponding RX phase response at the corresponding digital transceiver chain; and
receiving, through the calibration transceiver, a sounding signal from each TX reference node that is transmitted from the corresponding digital transceiver chain to generate the corresponding TX phase response.

10. The method of claim 8, wherein:
each analog TX chain and each analog RX chain comprises a variable gain amplifier (VGA) and a phase shifter, and
each beam definition comprises a gain setting for the VGA and a phase shift setting for the phase shifter of each analog TX chain or each analog RX chain.

11. The method of claim 10, further comprising, for each beamformer:
determining a phase shift offset that minimizes the phase difference between the TX and RX phase responses;
determining a gain offset that minimizes the magnitude difference between the TX and RX magnitude responses; and for either the beam definitions that comprise settings for the analog TX chains or the beam definitions that comprise settings for the analog RX chains, applying the phase shift offset to each phase shift setting and the gain offset to each gain setting as the reciprocity calibration.

12. The method of claim 8, wherein the beam definitions are initially generated based on an over-the-air beam calibration such that, for each analog beamformer:
   initial TX phase responses of each of the analog TX chains other than the TX reference node are aligned with an initial TX phase response of the TX reference node, the initial TX phase responses being measured at a boresight receiver that is located boresight to the TX reference node, and
   initial RX phase responses of each of the analog RX chains other than the RX reference node are aligned with an initial RX phase response of the RX reference node, the initial RX phase responses being measured based on transmissions from a boresight transmitter that is located boresight to the RX reference node.

13. The method of claim 8, further comprising periodically determining and applying the reciprocity calibration.

14. The method of claim 8, further comprising, for each analog beamformer, applying a selected one of the beam definitions to the analog TX chains to form a TX beam or to the analog RX chains to form an RX beam.

15. A non-transitory computer-readable medium configured to store instructions that, when executed by a processor, cause a hybrid multiple-input multiple-output (MIMO) system comprising a first number (N) of digital transceiver chains, N analog beamformers, and a calibration transceiver, to:
   for each analog beamformer, measure, using a corresponding digital transceiver chain and the calibration transceiver, a transmitter (TX) phase response and a TX magnitude response of a TX reference node of the analog beamformer and a receiver (RX) phase response and an RX magnitude response of an RX reference node of the analog beamformer, wherein each analog beamformer comprises a second number (M) of analog TX chains and M analog RX chains, one of the analog RX chains is the RX reference node, and one of the analog TX chains is the TX reference node;
   determine a reciprocity calibration for each analog beamformer based on a phase difference between the TX and RX phase responses and a magnitude difference between the TX and RX magnitude responses; and
   apply the reciprocity calibration to stored beam definitions of each analog beamformer to correct for the phase and magnitude differences.

16. The non-transitory computer-readable medium of claim 15, wherein the instructions, when executed by a processor, further cause the hybrid MIMO system to:
   transmit, using the calibration transceiver, a sounding signal to each RX reference node to generate the corresponding RX phase response at the corresponding digital transceiver chain; and
   receive, through the calibration transceiver, a sounding signal from each TX reference node that is transmitted from the corresponding digital transceiver chain to generate the corresponding TX phase response.

17. The non-transitory computer-readable medium of claim 15, wherein:
   each analog TX chain and each analog RX chain comprises a variable gain amplifier (VGA) and a phase shifter, and
   each beam definition comprises a gain setting for the VGA and a phase shift setting for the phase shifter of each analog TX chain or each analog RX chain.

18. The non-transitory computer-readable medium of claim 17, wherein the instructions, when executed by a processor, further cause the hybrid MIMO system to:
   determine a phase shift offset that minimizes the phase difference between the TX and RX phase responses;
   determine a gain offset that minimizes the magnitude difference between the TX and RX magnitude responses; and
   for either the beam definitions that comprise settings for the analog TX chains or the beam definitions that comprise settings for the analog RX chains, apply the phase shift offset to each phase shift setting and the gain offset to each gain setting as the reciprocity calibration.

19. The non-transitory computer-readable medium of claim 15, wherein the beam definitions are initially generated based on an over-the-air beam calibration such that, for each analog beamformer:
   initial TX phase responses of each of the analog TX chains other than the TX reference node are aligned with an initial TX phase response of the TX reference node, the initial TX phase responses being measured at a boresight receiver that is located boresight to the TX reference node, and
   initial RX phase responses of each of the analog RX chains other than the RX reference node are aligned with an initial RX phase response of the RX reference node, the initial RX phase responses being measured based on transmissions from a boresight transmitter that is located boresight to the RX reference node.

20. The non-transitory computer-readable medium of claim 15, wherein the instructions, when executed by a processor, further cause the hybrid MIMO system to:
   periodically determine and apply the reciprocity calibration.

* * * * *